Jan. 15, 1963 J E. KOSTUR 3,073,036
DEVICE FOR EXPANDING POLYSTYRENE IN PIECE FORM
Filed May 20, 1960
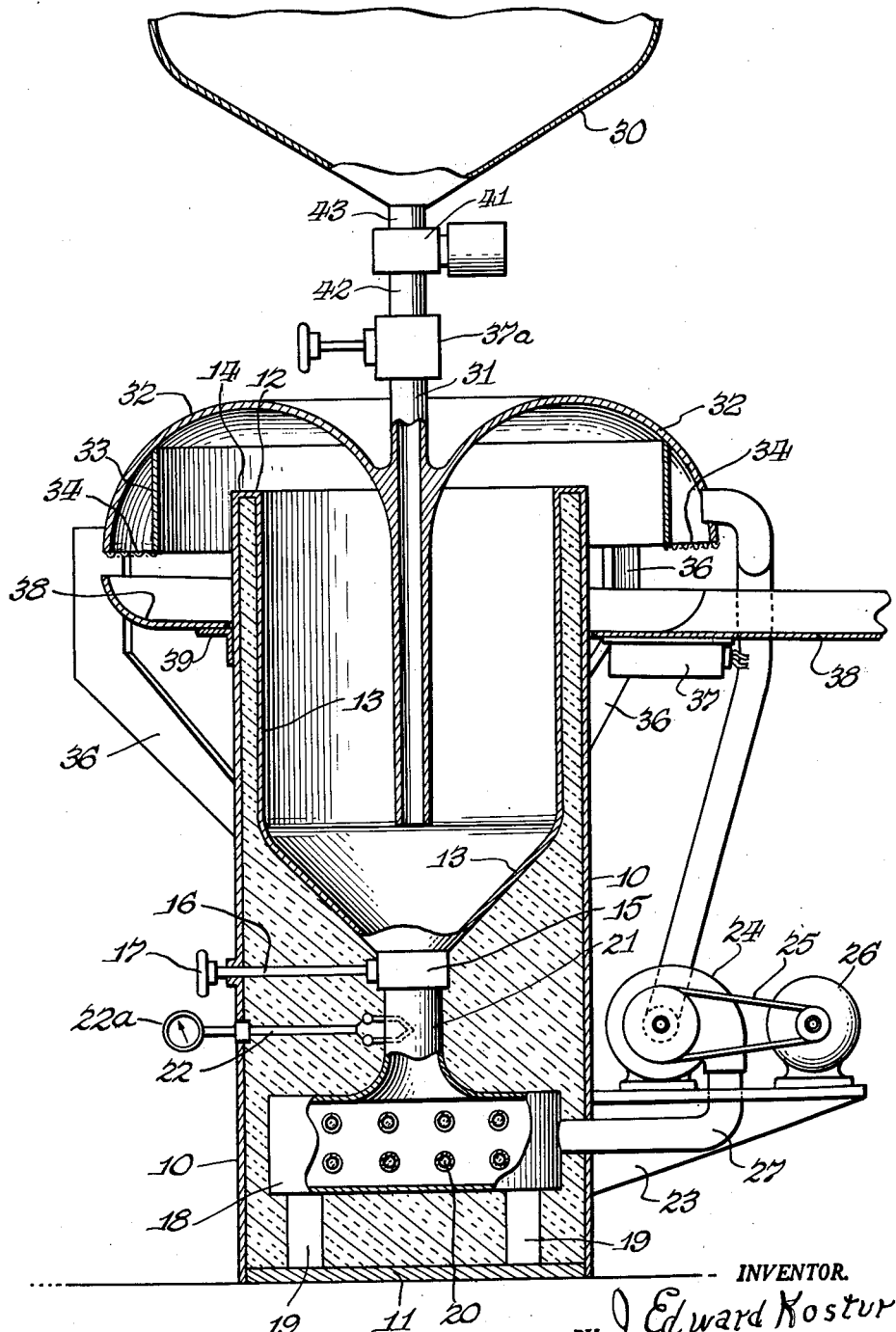
INVENTOR.
J. Edward Kostur
BY John F. Brezina
att'y

3,073,036
DEVICE FOR EXPANDING POLYSTYRENE IN PIECE FORM

J Edward Kostur, 330 Timber Trail S., Elmhurst, Ill.
Filed May 20, 1960, Ser. No. 30,517
2 Claims. (Cl. 34—57)

My invention relates to a novel device and method for automatically and continuously expanding polystyrene particles by applying heat and particularly those polystyrene materials which contain a dissolved blowing agent.

Expandable polystyrene is a commonly known type which contains dissolved blowing agents, are made and procurable in the form of beads and in granular form and in varied finely divided forms, and are used in various industrial processes. Such expandable polystyrene materials are known under the trademarks "Pelaspan," "Dylite" and "Unicrest." Such polystyrene is also known as one type of expansible synthetic resins.

Expandable polystyrene in beads and in pieces are expanded to varying densities according to the respective uses to which they are put. Such uses include uses as insulation and they are adapted to become sticky on their surfaces when heated and are adapted to stick together when brought into contact to form cellular bodies or masses of the desired varying shapes and sizes. Presently known methods of expansion by use of steam results in the beads becoming sticky and sticking together during heating to cause clogging of apparatus in which the same are subjected to steam.

It is an important object of my invention to provide a novel automatic device for continuously heating and expanding such expandable polystyrene beads, granules, or pieces and continuously delivering such expanded particles and beads in relatively dry form to a delivery chute from which they are delivered to various positions for storage and for future use.

It is a further object and accomplishment of my invention to provide a novel furnace and device for heating and continuously expanding polystyrene in piece form which includes a metal housing or furnace; a receptacle therein providing a heating chamber; heating elements below said receptacle; a blower; fittings communicating said blower and the lower part of said receptacle; an upper hopper with adjustable discharge means for selectively discharging polystyrene beads into said receptacle in a relatively dry state; and means over said receptacle for deflecting the expanded pieces and beads over the periphery of the receptacle into a discharge and delivery chute and which is adapted to operate automatically and continuously.

On the drawings:

FIG. 1 is a partially cross sectional view taken on a vertical plane, and with certain parts shown as broken away and certain parts shown in elevation.

Reference numeral 10 designates a vertically extending metal housing which is preferably cylindrical, and which has a closed bottom well or plate 11 and an upper periphery 12. A metal cylindrical receptacle 13 having a peripheral flange 14 is secured to the periphery 12 of said housing 10 by welding or the like. Said receptacle has a lower inclined conical portion in which is a lower inlet opening in which the housing of a valve 15 is suitably mounted, for example by threads (not shown).

Valve 15 has an elongated stem 16 which extends through a hole in the wall of housing 10 and carries a knob or handle 17. The vertical wall of receptacle 13 is spaced inwardly from the housing 10 to provide a chamber in which suitable insulation is installed.

Numeral 18 designates a transversely extending metal casing suitably mounted on leg supports 19 on the bottom of housing 10. Mounted and supported in said casing 18 are a plurality of heating elements 20 which are connected by a suitable non-conductive refractory member, and said elements 20 are connected to a source of electric power by wires (not shown). A passaged fitting or pipe 21 is integral with the upper wall of casing 18 and its upper end is suitably connected to the housing of valve 15.

A thermocouple 22 has its probe element mounted in said fitting, and it extends through an aperture in the wall of housing 10, as illustrated in FIG. 1. Said thermocouple has its inner probe element mounted in holes in and extending inwardly into the pipe 21, and has its graduated milliameter and thermostat 22a extending transversely and outwardly, as shown, and the latter indicates the temperature within pipe 21.

Numeral 23 designates a metal shelf or bracket suitably secured, as by welding, to the exterior of housing 10, as illustrated in FIG. 1. Mounted on said shelf is an electrically-driven air blower 24, which is operatively connected by an endless belt 25 to the pulley of electrical motor 26 mounted on said shelf 23.

The discharge nozzle of said blower 24 is communicatively connected by an angular pipe 27 to an aperture in the end of the casing 18, as illustrated.

Mounted above the periphery of receptacle 13 is a receiving material hopper 30 whose bottom portion is conical and terminates in a discharge opening defined by nipple 43. Connected to said discharge opening is the upper portion of the housing of a solenoid valve 41. A manually adjustable valve 37a is connected to upper end of said pipe 31, said valve having a projecting stem and knob, as shown. The electrically operable solenoid valve 41 is connected by a nipple 42 to the upper part of manual valve 37. Discharge pipe 31 is connected to the lower portion of valve 37a and extends into the chamber of receptacle 13.

A concave-like annular downwardly curved metal deflector or hood 32 is carried by and connected to the middle portion of the discharge pipe 31, and may optionally be made integral therewith. Said deflector 32 is supported by suitable angular brackets 36 connected thereto and whose lower ends are secured by welding to the side wall of housing 10, one of said brackets 36 being illustrated at the right of FIG. 1, and another of said brackets 36 being shown at the left of FIG. 1.

The deflector 32 is positioned with its middle portion spaced above the periphery of receptacle 13 and its peripheral flange 14 to provide a circumferential outlet passage.

The annular periphery of deflector 32 is bent horizontally and inwardly as shown in cross section. An annular metal ring-like baffle 33 is suitably secured in substantially vertical position inward of the outer peripheral wall of deflector 32, as shown in cross section in FIG. 1. This provides an annular space forming an air collector manifold 33a between baffle 33 and the edge portion of deflector 32. A ring-shaped screen 34 is suitably secured in horizontal position on the downward annular opening between baffle 33 and the periphery of deflector 32. The annular metal screen 34 is suitably mounted on the lower edge of baffle 33 and on the periphery of deflector 32, for example by screws, and over the opening of said manifold.

An electrically actuated vibrating device 37, which is connected by wires to an electric power source, is secured, for example, by welding, to the underside of the inclined discharge chute 38 which extends around the upper portion of housing 10 and which is secured to said housing by an angular metal bracket 39 which is secured thereto by welding.

The hot air is re-circulated from the area under deflector 32 to the feed inlet of the blower, thus increasing a saving of electricity and eliminating a great percentage of the heat losses normally released in the room.

The raw particles or granules of polystyrene introduced as aforesaid never touch the bottom of the chamber of receptacle 13 because they are air-borne and air-circulated at all times, thus eliminating the possibility of fusing into clusters or clogging the machine. The blowing of a given volume of air through the smaller opening of valve 15, which is emitted into the reduced lower portion of the receptacle 13, produces greater pressure in said reduced portion, thus floating the particles. As the chamber diameter of the receptacle 13 increases upwardly, the air expands and is rarefied and its pressure is reduced.

The operation is as follows:

By closing an electrical switch (not shown), said heating elements are energized and start heating the air circulated by driven blower 26 over and around said elements 20 through ducts 27 into the chamber of heat casing 18, through valve 15, and into receptacle 13 and expelled through the passage between baffle 33 and the upper end of the housing 10. The air is drawn back to the blower through inlet duct 27 and recirculated until the desired or pre-set temperature has been reached. At this time a thermostat (not shown) would energize and open solenoid valve 41 which is above control valve 37a, thus releasing particles to flow into the processing chamber of receptacle 13.

When the hot air is circulating, and when the material valve 37a and the solenoid valve 41 are opened at the bottom of the hopper, this allows the particles to fall into the expanding chamber of receptacle 13. As the particles become heated during their agitation in receptacle 13, they expand and grow larger and continue to grow until their size causes them to become buoyant and air-borne in the upper area of the chamber having the largest diameter, thus being carried with the air stream above said chamber and against deflector 32 and against baffle 33. Thereupon the expanded beads drop out of the air which is under reduced pressure, onto the collector chute 38 on which is mounted said electric vibrator 37, the vibration of the chute causing the beads to flow along the discharge chute 38 to a receptacle or to direct use.

A safety disconnecting switch (not shown) is provided to shut off solenoid valve 41 in case of electrical failure, burned-out motor, or broken belt. In other words, as soon as there is a drop on temperature below the desired pre-setting of thermostat, the electric current to the solenoid valve will become open and the solenoid valve, being a spring return self-closing valve, will close itself, thus stopping the flow of material into chamber 13 to prevent beads from running into the heating chamber.

Manual valve 37a is adapted to control amount of material flow, and valve 17 controls the amount of heated air passing into chamber 13, thus controlling the density of the expanded beads.

My described process produces expanded beads in dry form whereas other known methods using steam produce wet beads which as a result of the moisture cannot be used until after they are dried.

While the foregoing specification sets forth the invention in specific terms, it is to be understood that numerous changes in the shape, size and materials may be resorted to without departing from the spirit and scope of the invention as claimed hereinafter, and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A device for heat processing polystyrene in piece form; a vertically extending housing; an inner receptacle mounted within said housing and having a lower opening; an adjustable valve in the lower opening of said receptacle; a metal casing below said receptacle; electrical heating elements mounted below said receptacle; a passaged fitting communicatively connecting said valve and said casing; a thermostat mounted in said fitting; a driven blower; pipe means connecting said blower and said casing; a hopper mounted above said housing; a valve in the lower part of said hopper; a depending discharge tube connected to said hopper valve; a curved deflector mounted above the periphery of said receptacle; and a collector and discharge chute mounted below the periphery of said receptacle; said blower being adapted to blow air under pressure through said first mentioned adjustable valve to agitate and circulate pieces of polystyrene in suspension in said receptacle, the heat from said heating elements being adapted to heat and expand polystyrene pieces dropped into and circulating in said receptacle; said expanded pieces being adapted to rise and to be deflected by said deflector into said chute; said blower being adapted to blow air through said casing into the lower part of said receptacle to agitate and heat said pieces.

2. A device for heat processing polystyrene in piece form; a vertically extending housing; an inner receptacle mounted within said housing and having a lower opening; an adjustable valve mounted in the lower opening of said receptacle; a metal casing below said receptacle; electrical heating elements mounted below said receptacle; a passaged fitting communicatively connecting said valve and said casing; a thermostat mounted in said fitting; a driven blower; pipe means connecting said blower and said casing; a hopper mounted above said housing having a depending neck portion; a valve in the said neck portion; a depending discharge tube connected to said hopper valve; a curved annular deflector mounted above the periphery of said receptacle; and an annular collector mounted below the periphery of said receptacle; an annular baffle mounted below said deflector and forming an annular manifold between said baffle and said deflector; a discharge chute mounted below said collector; and a conduit communicatively connecting said manifold and said blower for returning air to said blower; said blower being adapted to blow air under pressure through said first mentioned adjustable valve to agitate and circulate pieces of polystyrene in suspension in said receptacle, the heat from said heating elements being adapted to heat and expand polystyrene pieces dropped into and circulating in said receptacle; said expanded pieces being adapted to rise and to be deflected by said deflector into said chute; said blower being adapted to blow air through said casing and said hopper valve into the lower part of said receptacle to agitate and heat said pieces.

References Cited in the file of this patent

UNITED STATES PATENTS

| | | |
|---|---|---|
| 1,250,553 | Bryan | Dec. 18, 1917 |
| 1,648,005 | Pritchard | Nov. 8, 1927 |
| 2,384,932 | Lechthaler | Sept. 18, 1945 |
| 2,581,134 | Odell | Jan. 1, 1952 |
| 2,922,355 | Green | Jan. 26, 1960 |